Aug. 23, 1966 P. M. THOMAS ETAL 3,268,098
RACK UNLOADER AND PALLET STRIPPING MACHINE
Filed May 28, 1964 5 Sheets-Sheet 2
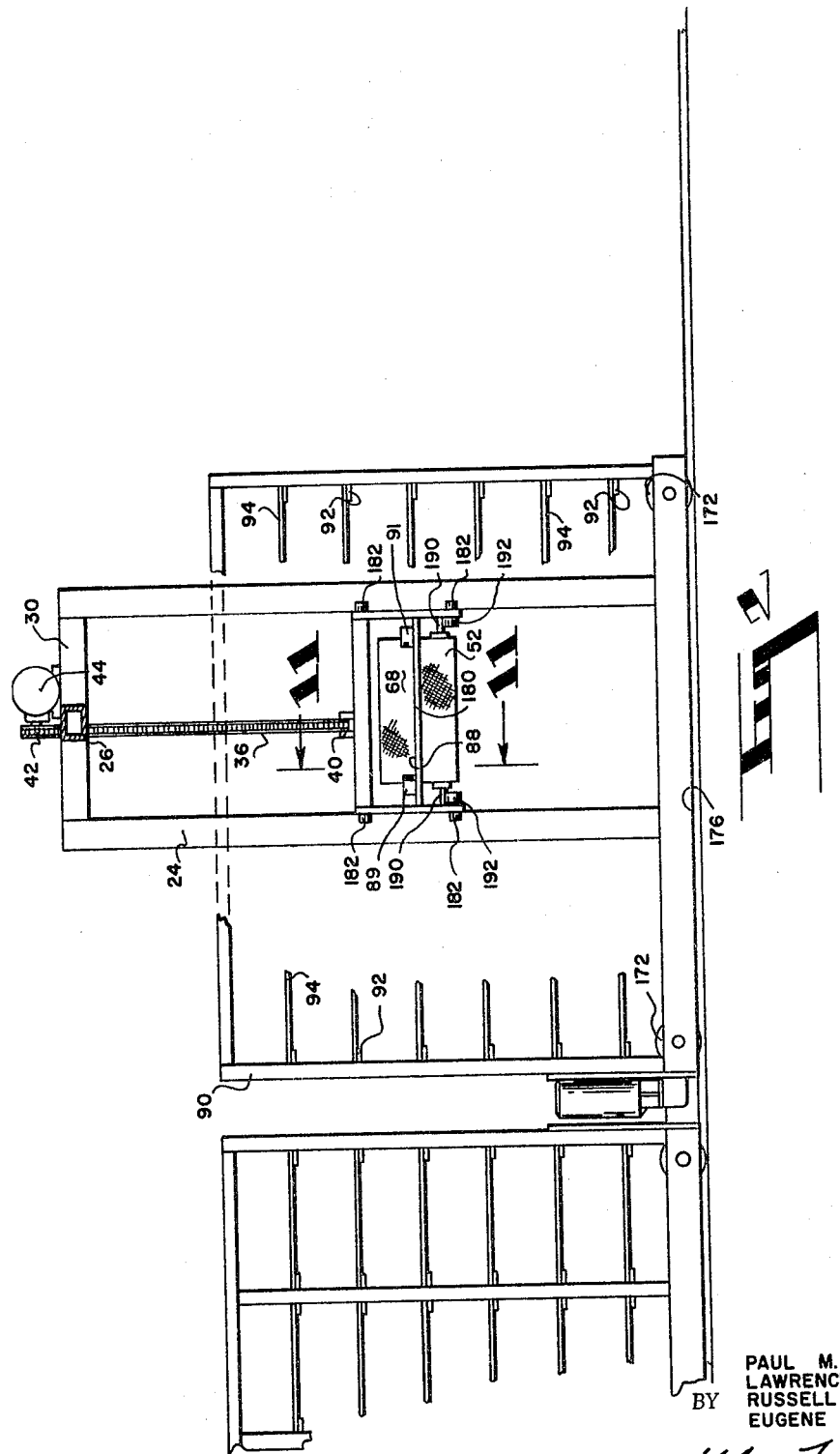
INVENTOR.
PAUL M. THOMAS
LAWRENCE W. WRIGHT
BY RUSSELL W. BURGE
EUGENE E. CRILE
Wm. H. Dean

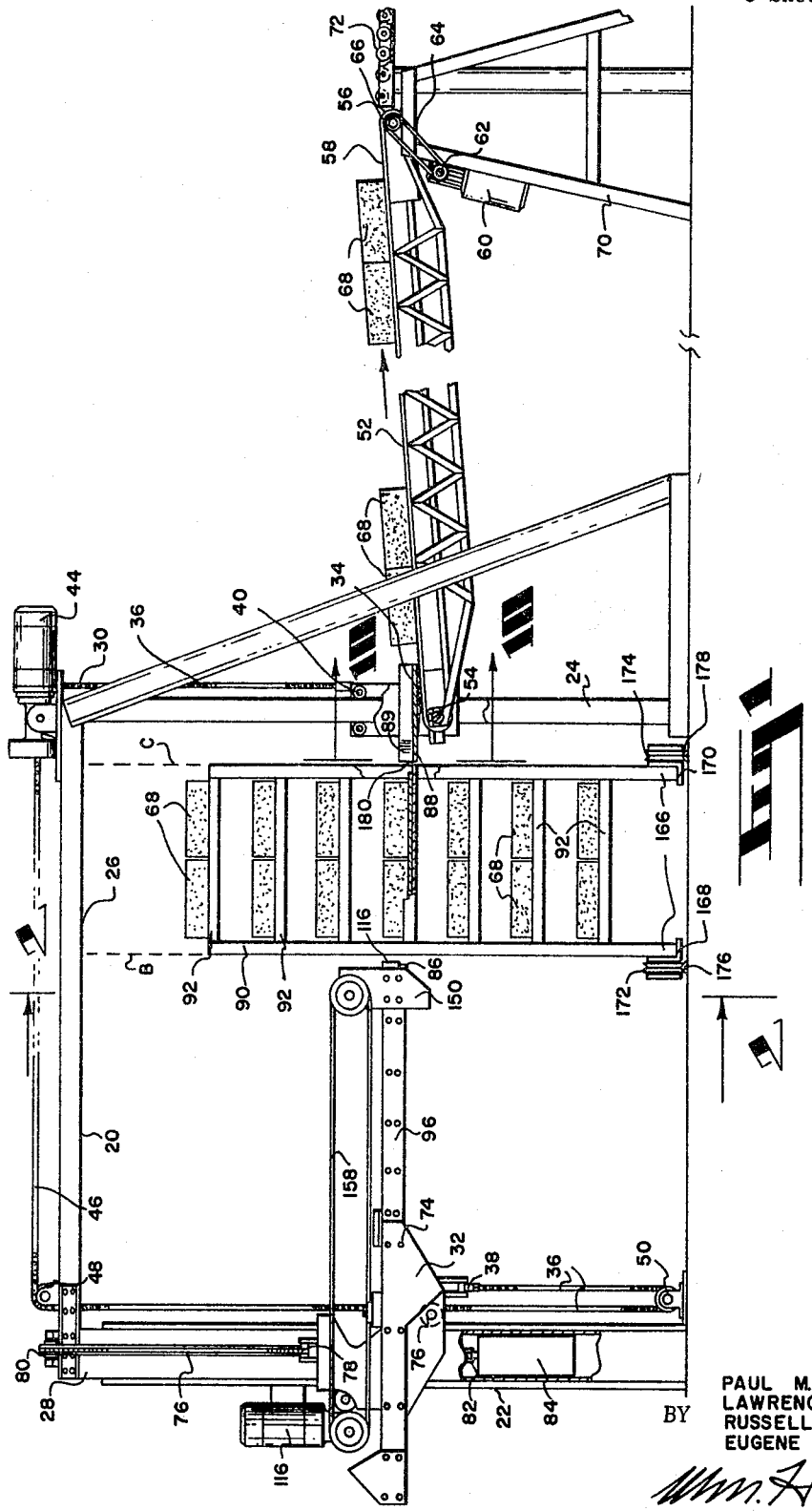

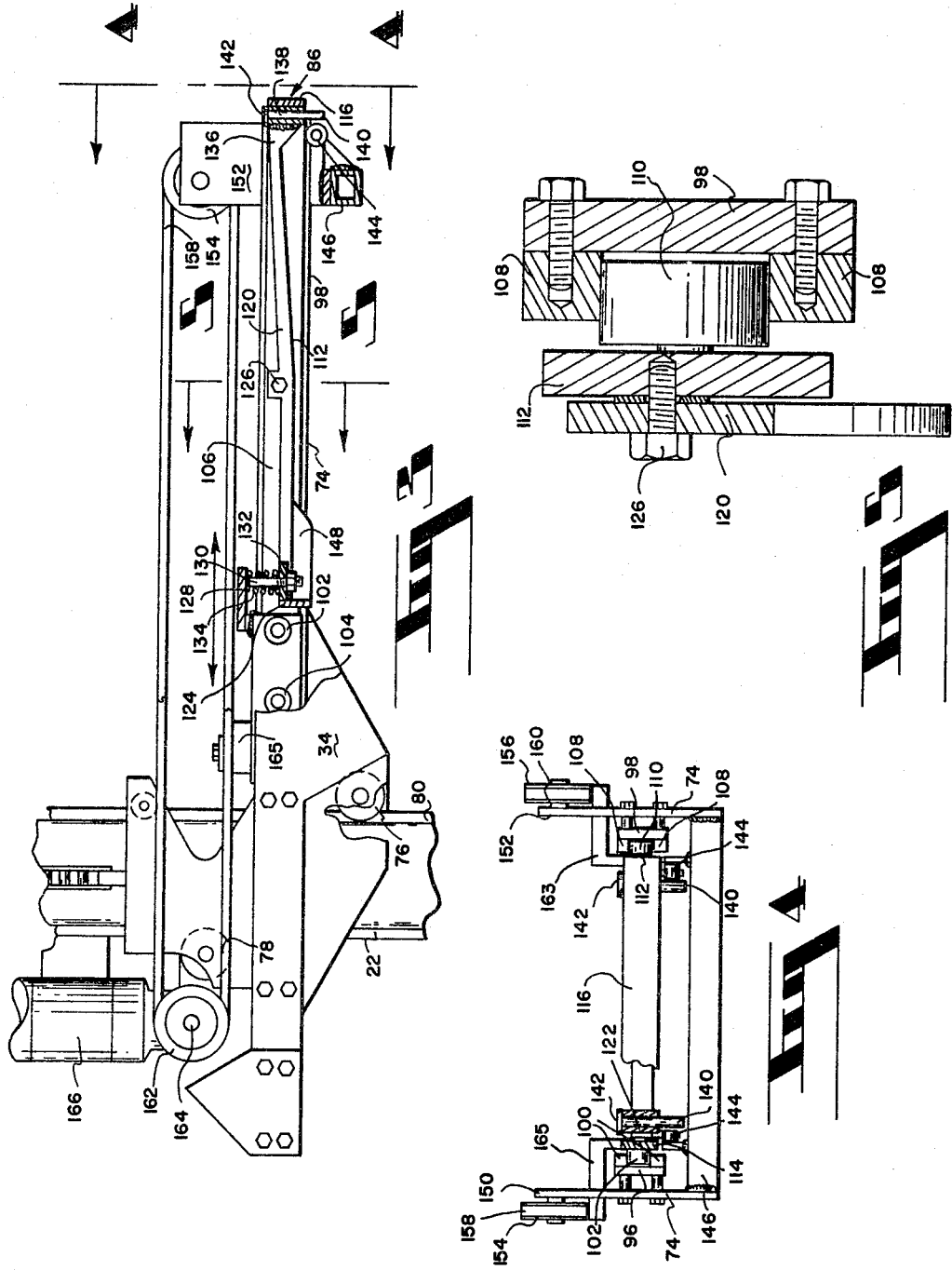

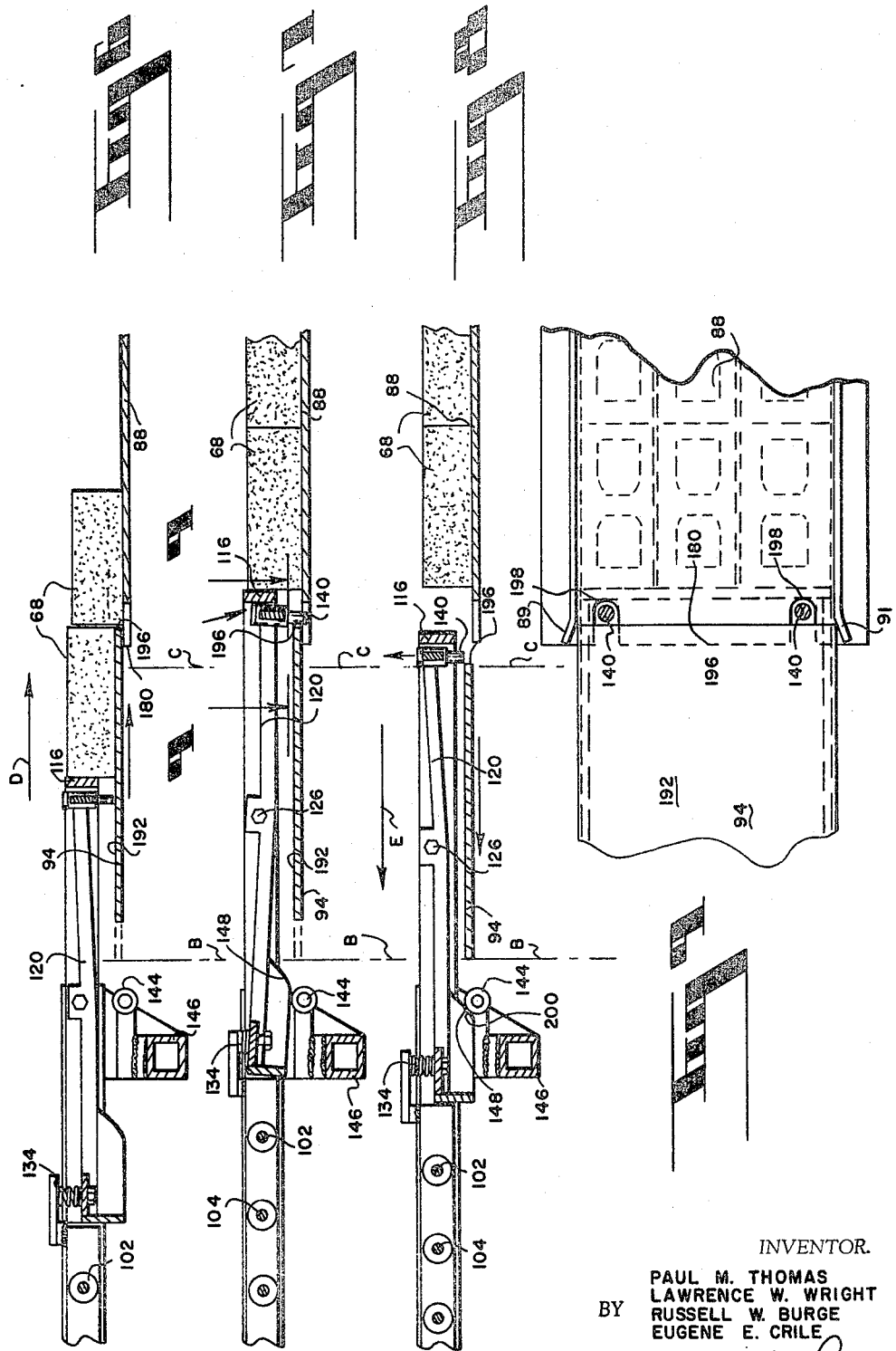

Aug. 23, 1966   P. M. THOMAS ETAL   3,268,098
RACK UNLOADER AND PALLET STRIPPING MACHINE
Filed May 28, 1964   5 Sheets-Sheet 5
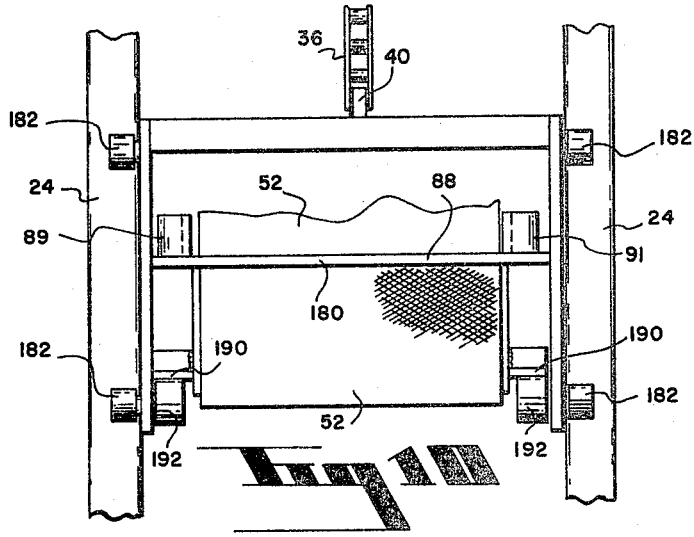
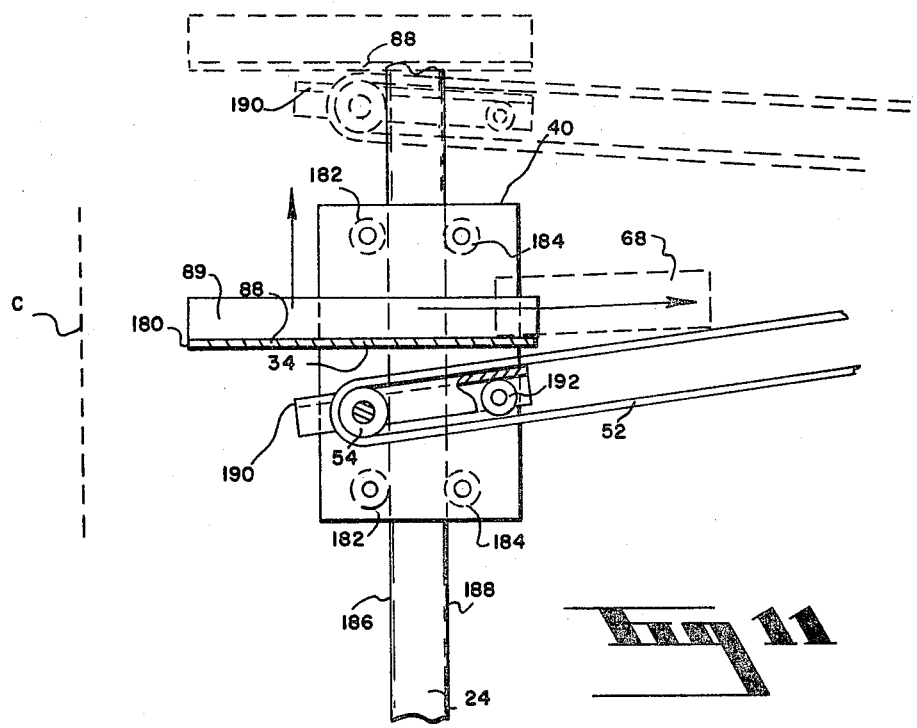
INVENTOR.
PAUL M. THOMAS
LAWRENCE W. WRIGHT
BY RUSSELL W. BURGE
EUGENE E. CRILE United States Patent Office 3,268,098
Patented August 23, 1966

3,268,098
RACK UNLOADER AND PALLET STRIPPING
MACHINE
Paul M. Thomas, 6530 E. Edgewood Road, Phoenix, Ariz.,
and Lawrence W. Wright, Scottsdale, Russell W. Burge,
Glendale, and Eugene E. Crile, Phoenix, Ariz.; said
Burge, Wright, and Crile assignors to said Thomas
Filed May 28, 1964, Ser. No. 370,812
14 Claims. (Cl. 214—16.4)

This invention relates to a rack unloader and pallet stripping machine and more particularly to a rack unloader and pallet stripping machine for use in the concrete block production and handling industry for concurrently removing concrete blocks from pallets in conventional pallet racks and for placing the removed blocks on a conveyor for transporting the blocks to a cubing machine, transport means for other location.

In a large percentage of the facilities in which conventional concrete blocks are manufactured, large racks having a plurality of bays of superimposed shelves support steel pallets on which concrete blocks are produced by concrete block compacting and forming machines and the blocks, thus, supported on the steel pallets are held in the racks after being removed from the machine and the racks containing the pallets and the uncured blocks are generally cured, either by ambient conditions or steam curing, subsequent to which the blocks must be removed from the pallets, either manually or by a machine.

In the past, much of the block stripping or removal of the blocks from the pallets in the racks has been done manually and such manual operations are very difficult, laborious and costly operations.

Various machines have been used to remove concrete blocks from pallets in the pallet racks, however, many of these machines cause the pallets to be displaced from the racks or completely removed therefrom, all of which causes the necessity for replacing the pallets in the racks or requires relocation of the pallets in the racks due to the fact that the machine stripping of blocks from the pallets oftentimes causes the pallets to be projected some distance laterally of the racks due to friction of the blocks being slidably moved off the pallets.

Additionally, it has been a problem to provide a simple, compact and reliable machine which will efficiently strip cured concrete blocks successively from a plurality of superimposed pallets in superimposed spaced shelves of pallet carrying racks and to properly place these blocks on an endless conveyor at various elevations automatically to transport the blocks from the pallets to a cubing machine, transport means or other location.

Accordingly, it is an object of the present invention to provide a very simple, efficient and reliable rack unloader and pallet stripping machine for use in removing concrete blocks from superimposed pallets in superimposed shelves of pallet supporting racks and for placing the blocks removed from the pallets on an endless conveyor and for moving the conveyor vertically at one end thereof in unison with a pusher of the machine which pushes blocks from a pallet on a level respective to the conveyor whereby the blocks pushed from the pallets may be readily received on the conveyor at a substantially common level.

Another object of the invention is to provide a novel rack unloader and pallet stripping machine which comprises a novel pusher mechanism for pushing blocks off pallets in racks and onto a conveyor and, also, a machine in which the pusher comprises a novel pallet retracting mechanism which automatically retracts pallets back into the rack shelf subsequent to the movement of the pallet laterally of the rack occasioned by friction of the blocks causing the pallet to move out of the racks during the slidable movement of the blocks off the pallet and onto a conveyor.

Another object of the invention is to provide a rack unloader and pallet stripping machine for use in removing concrete blocks from pallets in superimposed shelves of a pallet rack and for placing the removed blocks directly onto a conveyor of an endless type, said machine comprising novel means for maintaining one end of the conveyor in close proximity to the level of a pallet being stripped by the pusher of the machine and, also, to provide for pivotal mounting of one end of the conveyor in a position to receive concrete blocks pushed from pallets in racks at various superimposed levels coinciding with shelves in pallet racks.

Another object of the invention is to provide a very simple horizontal pusher mechanism for pushing blocks off pallets and for retracting pallets backwardly into the racks in an opposite direction after the friction of the blocks has caused the pallets to be slightly displaced from the racks and further, to provide means of the machine for serving as an abuttment for the pallets slidably moved out of the racks during displacement of the blocks from the pallet and for acting as a platform to receive the blocks between the pusher mechanism and an endless conveyor disposed to carry the blocks away from the platform.

Further objects and advantages of the invention may be apparent from the following specification, appended claims and accompanying drawings, in which:

FIG. 1 is a side elevational view of a rack unloader and pallet stripping machine in accordance with the present invention showing portions broken away and in section to amplify the illustration;

FIG. 2 is a sectional view taken from the line 2—2 of FIG. 1 showing portions of conventional rack structure broken away to facilitate the illustration;

FIG. 3 is an enlarged side elevational view of the carriage and pusher mechanism of the machine similar to that as shown in FIG. 1, but showing portions of the structure broken away and in section to amplify the illustration;

FIG. 4 is an end view of the pusher mechanism taken from the line 4—4 of FIG. 3;

FIG. 5 is an enlarged sectional view taken from the line 5—5 of FIG. 3;

FIG. 6 is a sectional view taken from the line 6—6 of FIG. 4 showing a concrete block pusher and pallet retracting mechanism in accordance with the present invention in a position wherein the pusher is pushing concrete blocks from a pallet in a rack and onto a receiving platform of the invention;

FIG. 7 is another view similar to FIG. 6, but showing the pusher in a further position in which the pusher mechanism has completely pushed concrete blocks from a pallet and onto a platform of the invention and wherein the retracting means of the pusher has moved down to engage an edge of a pallet from which the blocks have been removed in order subsequently to retract the pallet into a position in the pallet rack coinciding with the lateral limits of the rack;

FIG. 8 is another view similar to FIG. 6 showing the pusher mechanism of the invention moving in a retracting direction and at a position wherein the pallet engaged, as shown in FIG. 7, has been retracted to the proper lateral limits with respect to the rack in which it is supported and wherein a retracting mechanism of the pusher is vertically released from the edge of the pallet so that further retraction of the pusher away from the block receiving platform of the invention will permit retracting mechanism to freely clear the pallet and leave it in proper position in the rack;

FIG. 9 is an enlarged fragmentary plan sectional view taken from the line 9—9 of FIG. 7;

FIG. 10 is an enlarged fragmentary sectional view taken from the line 10—10 of FIG. 1; and FIG. 11 is an enlarged fragmentary sectional view taken from the line 11—11 of FIG. 2 and showing by broken lines varying positions of a block receiving platform and carriage and an endless conveyor supported thereby.

As shown in FIG. 1 of the drawings, the rack unloading and pallet stripping machine of the invention comprises a frame 20 including horizontally spaced substantially vertical portions 22 and 24 which are interconnected by an elevated horizontal frame portion 26 fixedly interconnecting upper ends 28 and 30 of the frame portions 22 and 24.

A pusher carriage 32 is vertically movable upwardly and downwardly on the frame portion 22 and a platform carriage 34 is vertically movable upwardly and downwardly on the frame portion 24, these carriages 32 and 34 are interconnected by a flexible chain 36, one end 38 of which is connected to the carriage 32 and the opposite end 40 of which is connected to the carriage 34. This chain 36 passes over a drive sprocket 42 on an upper portion 30 of the frame 20, this sprocket 42 being driven by a gear motor 44, a horizontal portion of the chain 36 designated 46 passes above the frame portion 26 and over another sprocket 48 then downwardly and substantially 180° around a sprocket 50 and then upwardly to the connection of its end 38 with the carriage 32. In this maner, the carriages 32 and 34 may be driven upwardly and downwardly by the motor 44 in the same direction and in substantially horizontal alignment with each other, as will be hereinafter described.

An endless conveyor 52 is a conventional belt-type conveyor having rollers 54 and 56 over which endless belt 58 passes. This belt is driven by a motor 60 having an output sprocket 62 driving a chain 64 engaging another sprocket 66 on the axle of the roller 56, hereinbefore described.

The end of the conveyor 52 at the roller 54 is pivotally mounted on the platform carriage 34 and moves upwardly and downwardly with the carriages 32 and 34 so that one end at the roller 54 of the conveyor 52 is mounted to remain in position to receive blocks 68 from the platform carriage 34 after they are pushed thereonto by a pusher in connection with the pusher carriage 32, all as will be hereinafter described in detail. The conveyor 52 at the axis of the roller 56 is pivotally mounted on a stationary frame 70 and the conveyor 52 is, thus, arranged to move upwardly and downwardly at its roller 54 and to be held horizontally stationary at the axis of its roller 56. In this manner, the conveyor 52 may deliver concrete blocks to a secondary conveyor 72 located at a cubing machine or which may be located to supply some transport means or other destination of the blocks 68 as they pass from the conveyor belt 52.

The pusher 32 is provided with a frame 74 having rollers 76 and 78 disposed ot engage track portions 80 and 82, respectively, at opposite sides of the vertical frame 22. The pusher frame 74 is, thus, mounted in cantilever fashion to move upwardly and downwardly on the vertical frame portion 22.

A chain 76 is fixed at 78 to the frame 74 and this chain passes upwardly and over a sprocket 80 on the upper end of the frame portion 22 and this chain extends downwardly through a hollow section of the frame portion 22 and is connected at 82 with a counterweight 84 which tends to balance the vertical load of the carriages 32 and 34 in order to alleviate weight loading of the sprocket 42 and the motor 44.

An outboard end 86 of the pusher frame 74 is spaced from a horizontal platform 88 of the platform carriage 34 in order to admit a conventional concrete block pallet rack 90 between said end 86 and the platform 88. The conventional concrete block rack is provided with a plurality of superimposed shelves 92 which support pallets 94 carrying concrete blocks 68 thereon. The carriages 32 and 34 are movable upwardly and downwardly in unison with each other to index with the pallets on any one of the shelves 92, as desired, and therefore these carriages may be moved successively from one shelf to another vertically successively to push the concrete blocks 68 horizontally from the pallets and onto the platform 88 of the platform carriage 34.

The pusher frame 74, as shown in FIG. 4 of the drawings, is provided with a pair of spaced arms 96 and 98. The arm 96 is provided with a pair of vertically spaced horizontally disposed track members 100 between which are engaged rollers 102 and 104 which are connected to a pusher assembly 106. Connected to the arm 98 are spaced horizontally disposed tracks 108 between which rollers 110 are movable. These rollers 110 being similar to the rollers 102 and 104. The pusher assembly 106 is provided with a pair of frame side members 112 and 114 to which the rollers 102 and 110, respectively, are connected and the side members 112 and 114 are connected at their outboard ends by a cross member 116.

Pivotally connected to the pusher side members 112 and 114 are pallet retraction arms 120 and 122. These arms are connected together at their rearward portions by a cross member 124 and are pivoted intermediate their ends by bolts 126 connected to the pusher side frame members 112 and 114.

A bracket 128 carried at its opposite ends on the side members 112 and 114 is provided with a downwardly extending bolt 130 which extends through an opening 132 in the cross member 124. A spring 134 surrounds the bolt 130 and tends to exert a downward force on the cross member 124 to thereby pivot the arms 120 and 122 upwardly at their outer end portions 136. The outer end portions 136 are provided with tubular members 138 in which rake pins 140 are freely reciprocally mounted, the pins 140 having enlarged heads 142 limiting the downward slidable movement thereof in the tubular members 138, all as shown best in FIGS. 3 and 4 of the drawings. It will be seen from FIGS. 3 and 4, that a pair of these rake pins 140 extend downwardly and are engageable with edges of pallets, as will be hereinafter described in detail.

Rollers 144 disposed near the outer end 86 of the carriage 32 are mounted on a cross member 146 connected to the arms 74. The rollers 144 being disposed to actuate cams 148, as will be hereinafter described in connection with FIGS. 6, 7 and 8.

Secured to the arms 74 and the bar 176 are upstanding brackets 150 and 152 which support pulleys 154 and 156 carrying belts 158 and 160. These belts 158 and 160 also pass over similar pulleys 162 on an axle 164 driven by a motor 166. The two belts 158 and 160 are connected to brackets 163 and 165 extending upwardly and laterally from the side members 112 and 114 of the pusher frame. Thus, the motor 166 and the belts 158 and 160 may move the pusher backwardly and forwardly in directions as indicated by the double ended arrow A in FIG. 3 of the drawings. Reference is now made to FIG. 1 of the drawings disclosing a pallet rack 90 having vertical members provided with lower ends 166 supported on frames 168 and 170 of a truck having annular V-shaped rollers 172 and 174 operating on fixed tracks 176 and 178. These tracks, thus, align each rack 90 so that the opposite sides thereof coincide with broken line positions generally indicated at B and C in FIGS. 1, 6 and 7 of the drawings. Accordingly, these lines B and C represent opposite side locations of the rack as disposed between the end 86 of the pusher carriage 32 and an edge 180 of a platform 88 of the platform carriage 34 which is provided with opposed rollers 182 and 184 at upper and lower ends of the carriage which engage track surfaces 186 and 188 to align the carriage with the vertical frame portion 24 and to support it thereon as it is moved upwardly and downwardly, as hereinbefore described. The endless conveyor 52, as shown in FIG. 11 of the drawings, is provided with a frame plate 190 engaging a roller disposed on a horizontal axis and carried by the carriage 34. This roller being designated 192 and being disposed below the platform 34 in such position that the end of the conveyor 52 passing over the roller 54 may move longitudinally and pivot at the same time below the platform 88 so that blocks 68 pushed off the platform 88 by the pusher of the machine may be loaded directly onto the conveyor 52.

It will be seen that opposite side locations B and C of the rack 90 are adjacent the outboard end 86 of the pusher frame 32 and the receiving edge 180 of the platform 88 of the platform carriage 34.

Referring now to FIGS. 6, 7 and 8, it will be seen that when the motor 116 is energized, as hereinbefore described, it may force the belts 158 and 160 to project the pusher longitudinally of the tracks 100 and 108 to cause the end cross member 116 to force concrete blocks 68 from the upper surface 192 of a pallet 94 onto the platform 88 and between converging guides 89 and 91 carried by the platform 88. As the blocks 68 are being pushed from the upper surface 193 of the pallet 94, shown in FIG. 6 of the drawings, friction of these blocks causes the pallet 94 at its edge 196 to be stopped by contact with the converging guides 89 and 91. Thus, friction of the blocks 68 cause the pallet 94 to move in the pallet rack 90 and project beyond the side location of the rack designated by the broken line C in FIG. 6 of the drawings.

As the pusher proceeds in a direction of an arrow D in FIG. 6 of the drawings, and continues in this direction to a position, as shown in FIG. 7 of the drawings, the blocks 68 are forced between the guides 89 and 91 completely onto the platform 88 and the arms 120 and 122 are forced to pivot about the pins 126 by engagement of the cams 148 with the rollers 144. This forces the retractor pins 140 downwardly through notches 198 in the edge 180 of the platform 88, all as shown best in FIGS. 7 and 9 of the drawings. In this position, the retractor pins 140 are disposed beyond the edge 196 of the pallet 94 and are ready to retract the pallet back into a position wherein its opposite edges are between the broken lines B and C which are in coincidence with opposite sides of the rack 90. Accordingly, as the motor 166 is reversed, the pusher side members 112 and 114 are retracted in a direction of an arrow E, shown in FIG. 8 of the drawings, until a curved precipice 200 of each cam 148 passes over the respective rollers 144 allowing the spring 134 to pivot the arms 120 and 122 to lift the pins 140 out of interference with the edge 196 of the pallet 94 and to thereby release the pallet from the pins 140 at the instant that the opposite edges of the pallet come into coincidence with the opposite sides of the rack generally designated by broken lines B and C in FIG. 8 of the drawings.

It will be appreciated that the pallet retraction mechanism, as shown and described in connection with FIGS. 6 to 9 of the drawings, provides a very simple automatic means of retrieving or retracting the pallet and returning it to a position properly disposed in the rack 90 after the pallet has been frictionally pushed a certain distance out of the rack and into engagement with the receiving edge of the platform 88. This receiving edge 180 of the platform 88 serves as a stop for the pallet during the pushing of blocks therefrom and onto the platform 88 and subsequent groups of blocks pushed from subsequently unloaded pallets by the pusher hereinbefore described causes the blocks to be progressively moved from the upper surface of the platform 88 and onto the conveyor 52, as hereinbefore described.

Outward movement of the pusher and vertical indexing of the carriages 32 and 34 are controlled by electrical circuitry and limit switches which are no part of the present invention, but which are conventional. This operation, however, may be performed by several different systems known in the art for vertically indexing the carriages 32 and 34 with a respective superimposed shelves in the rack 90 and inward and outward movement of the pusher mechanism may be controlled by suitable limit switches in circuit with the various power operated mechanisms of the invention. Additionally, complete cycle operation of the machine may include functions of a conventional stepper switch in combination with various limit switches and power operated mechanisms to control the motors 44, 116 and the conveyor operating motor 60 as well as movement of the trucks along the tracks 176 and 178 to carry the pallet racks 90 and to dispose various bays of pallets in alignment between the end 86 of the carriage 32 and the receiving edge 180 of the platform 88.

It will be obvious to those skilled in the art that various modifications of the present invention may be resorted to in a manner limited only by a just interpretation of the following claims.

We claim:

1. In a rack unloader and concrete block pallet stripper the combination of: first and second horizontally spaced upstanding frame portions disposed to receive a concrete block pallet rack therebetween, said rack having vertically superimposed spaced pallet shelves disposed to support substantially horizontally disposed concrete block laden pallets; a first carriage vertically movable on said first upstanding portion of said frame; a second carriage vertically movable on said second upstanding portion of said frame; means for driving said first and second carriages in unison and upon a common level with each other up and down, said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movably extendable and retractable beyond an end of said first carriage toward said second carriage for pushing blocks off from said pallets and toward said conveyor; said pusher when slidably pushing blocks off from said pallets tending to slide said pallets out of the shelves in said rack in a direction toward said second carriage; pallet retraction means pivoted on said pusher on a horizontal axis; downwardly directed pallet edge engaging means of said pallet retraction means at an end of said pusher directed toward said second carriage; and second cam means on said pallet retraction means; engagement of said first and second cam means caused by movement of said pusher on said first carriage disposed to cause pivotal movement of said pallet retraction means about a horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack.

2. In a rack unloader and concrete block pallet stripper the combination of: first and second horizontally spaced upstanding frame portions disposed to receive a concrete block pallet rack therebetween, said rack having vertically superimposed spaced pallet shelves disposed to support substantially horizontally disposed concrete block laden pallets; a first carriage vertically movable on said first upstanding portion of said frame; a second carriage vertically movable on said second upstanding portion of said frame; means for driving said first and second carriages in unison and upon a common level with each other up and down, said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movable extendable and retractable beyond an end of said first carriage toward said second carriage for pushing blocks off from said pallets and toward said conveyor; said pusher when slidably pushing blocks off from said pallets tending to slide said pallets out of the shelves in said rack in a direction toward said second carriage; pallet retraction means pivoted on said pusher on a horizontal axis; downwardly directed pallet edge engaging means of said pallet retraction means at an end of said pusher directed toward said second carriage; and second cam means on said pallet retraction means; engagement of said first and second cam means caused by movement of said pusher on said first carriage disposed to cause pivotal movement of said pallet retraction means about a horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack; resilient means tending to pivot said pallet retraction means in a direction opposite to that caused by said cam means.

3. In a rack unloader and concrete block pallet stripper the combination of: first and second horizontally spaced upstanding frame members disposed to receive a concrete block pallet rack therebetween, said rack having vertically superimposed spaced pallet shelves disposed to support substantially horizontally disposed concrete block laden pallets; a first carriage vertically movable on said first upstanding members; a second carriage vertically movable on said second upstanding member; means for driving said first and second carriages in unison and upon a common level with each other up and down, said first and second upstanding members, respectively; means for supporting said pallet rack between said first and second carriages; a block receiving platform on said second carriage; a conveyor having one end thereof pivotally and slidably supported on said second carriage and disposed to receive blocks slidably moved horizontally from said platform; a power driven pusher movably mounted on said first carriage and extendable and retractable beyond an end of said first carriage toward said second carriage for pushing blocks off from said pallets and onto said platform, said pusher when slidably pushing blocks off from said platform tending to slide said pallets out of the shelves in said racks in a direction toward said second carriage due to friction of the blocks moving on the pallet; pallet retraction means pivoted on said pusher on a horizontal axis; downwardly directed pallet edge engaging means of said pallet retraction means at an end of said pusher directed toward said second carriage; first cam means on said first carriage; and second cam means on said pallet retraction means; engagement of said first and second cam means caused by movement of said pusher on said first carriage causing pivotal movement of said pallet retraction means about said horizontal axis and downwardly at said pallet edge engaging means when said pusher projects blocks from one of said pallets to said platform, whereby an edge of the respective pallet is engaged by said downwardly directed pallet edge engaging means whereupon retraction of said pusher causes the pallet to be pulled backwardly into position in a respective shelf of a supporting rack, said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack.

4. In a rack unloader and concrete block pallet stripper the combination of: first and second horizontally spaced upstanding frame portions disposed to receive a concrete block pallet rack therebetween, said rack having vertically superimposed spaced pallet shelves disposed to support substantially horizontally disposed concrete block laden pallets; a first carriage vertically movable on said first upstanding portion of said frame; a second carriage vertically movable on said second upstanding portion of said frame; means for driving said first and second carriage in unison and upon a common level with each other up and down, said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movably extendable and retractable beyond an end of said first carriage toward said second carriage for pushing blocks off from said pallets and toward said conveyor; said pusher when slidably pushing blocks off from said pallets tending to slide said pallets out of the shelves in said rack in a direction toward said second carriage; pallet retraction means pivoted on said pusher on a horizontal axis; downwardly directed pallet edge engaging means of said pallet retraction means at an end of said pusher directed toward said second carriage; and second cam means on said pallet retraction means; engagement of said first and second cam means caused by movement of said pusher on said first carriage disposed to cause pivotal movement of said pallet retraction means about a horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack; a frame element interconnecting said upstanding frame portions; a rotating element at an upper level of each upstanding portions, a rotating element at a lower level of one of said upstanding frame portions; a flexible means passing over all of said rotating elements and having its opposite ends connected to said first and second carriages; and means of said frame disposed to move said flexible means in opposite directions to raise and lower said first and second carriages relative to said vertically spaced shelves of said pallet rack.

5. In a rack unloader and concrete block pallet stripper the combination of: first and second horizontally spaced upstanding frame members disposed to receive a concrete block pallet rack therebetween, said rack having vertically superimposed spaced pallet shelves disposed to support substantially horizontally disposed concrete block laden pallets; a first carriage vertically movable on said first upstanding members; a second carriage vertically movable on said second upstanding member; means for driving said first and second carriages in unison and upon a common level with each other up and down, said first and second upstanding member, respectively; means for supporting said pallet rack between said first and second carriages; a block receiving platform on said second carriage; a conveyor having one end thereof pivotally and slidably supported on said second carriage and disposed to receive blocks slidably moved horizontally from said platform; a power driven pusher movably mounted on said first carriage and extendable and retractable beyond an end of said first carriage toward said second carriage for pushing blocks off from said pallets and onto said platform, said pusher when slidably pushing blocks off from said platform tending to slide said pallets out of the shelves in said racks in a direction toward said second carriage due to friction of the blocks moving on the pallet; pallet retraction means pivoted on said pusher on a horizontal axis; downwardly directed pallet edge engaging means of said pallet retraction means at an end of said pusher directed toward said second carriage; first cam means on said first carriage; and second cam means on said pallet retraction means; engagement of said first and second cam means caused by movement of said pusher on said first carriage causing pivotal movement of said pallet retraction means about said horizontal axis and downwardly at said pallet edge engaging means when said pusher projects blocks from one of said pallets to said platform, whereby an edge of the respective pallet is engaged by said downwardly directed pallet edge engaging means whereupon retraction of said pusher causes the pallet to be pulled backwardly into position in a respective shelf of a supporting rack, said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack; resilient means tending to pivot said pallet retraction means in a direction opposite to that caused by said cam means.

6. In a rack unloader and concrete block pallet stripper the combination of: first and second horizontally spaced upstanding frame members disposed to receive a concrete block pallet rack therebetween, said rack having vertically superimposed spaced pallet shelves disposed to support substantially horizontally disposed concrete block laden pallets; a first carriage vertically movable on said first upstanding members; a second carriage vertically movable on said second upstanding member; means for driving said first and second carriages in unison and upon a common level with each other up and down, said first and second upstanding members, respectively; means for supporting said pallet rack between said first and second carriages; a block receiving platform on said second carriage; a conveyor having one end thereof pivotally and slidably supported on said second carriage and disposed to receive blocks slidably moved horizontally from said platform; a power driven pusher movably mounted on said first carriage and extendable and retractable beyond an end of said first carriage toward said second carriage for pushing blocks off from said pallets and onto said platform, said pusher when slidably pushing blocks off from said platform tending to slide said pallets out of the shelves in said racks in a direction toward said second carriage due to friction of the blocks moving on the pallet; pallet retraction means pivoted on said pusher on a horizontal axis; downwardly directed pallet edge engaging means of said pallet retraction means at an end of said pusher directed toward said second carriage; first cam means on said first carriage; and second cam means on said pallet retraction means; engagement of said first and second cam means caused by movement of said pusher on said first carriage causing pivotal movement of said pallet retraction means about said horizontal axis and downwardly at said pallet edge engaging means when said pusher projects blocks from one of said pallets to said platform, whereby an edge of the respective pallet is engaged by said downwardly directed pallet edge engaging means whereupon retraction of said pusher causes the pallet to be pulled backwardly into position in a respective shelf of a supporting rack, said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack; a frame element interconnecting said upstanding frame portion; a rotating element at an upper level of each of said upstanding portions; another rotating element on a lower level of one of said upstanding portions; a flexible means passing over all of said rotating elements and having its opposite ends connected to said first and second carriages; and means on said frame disposed to move said flexible means in opposite directions to raise and lower said first and second carriages relative to said vertically spaced shelves of said pallet rack.

7. In a rack unloader and concrete block pallet stripper the combination of: first and second horizontally spaced upstanding frame portions disposed to receive a concrete block pallet rack therebetween; said rack having vertically superimposed spaced pallet shelves disposed to support substantially horizontally disposed concrete block laden pallets; a first carriage vertically movable on said first upstanding frame portion; a second carriage vertically movable on said second upstanding frame portion; means for driving said first and second carriages in unison and upon a common level with each other and up and down, said first and second upstanding frame portions, respectively; means for supporting said pallet rack between said first and second carriages; a block receiving platform on said second carriage; a conveyor having one end thereof pivotally and slidably supported on said second carriage below said platform and disposed to receive blocks slidably moved horizontally from said platform; a power driven pusher mounted on said first carriage and movably extendable and retractable beyond an end of said first carriage toward said second carriage for pushing blocks off from said pallets and onto said platform; said pusher when slidably pushing blocks off from said pallets tending to slide said pallets out of said shelves due to friction of said concrete blocks on said pallets, thereby moving said pallets in a direction toward second carriages; pallet retraction means pivoted on said pusher on a horizontal axis; downwardly directed pallet edge engaging means on said pallet retraction means at an end of said pusher directed toward said second carriage; first cam means on said first carriage; and second cam means on said pallet retraction means; engagement of said first and second cam means caused by movement of said pusher on said first carriage causing pivotal movement of said pallet retraction means about said horizontal axis and downwardly at said pallet an edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to pivot said pallet retraction means upwardly to move said pallet edge engaging means out of engagement with an edge of said pallet when said pusher is retracted relative to said first carriage to a position corresponding with a proper position of a pallet relative to a shelf in said rack.

8. In a rack unloader and concrete block pallet stripper the combination of: first and second horizontally spaced upstanding frame portions disposed to receive a concrete block pallet rack therebetween, said rack having vertically superimposed spaced pallet shelves disposed to support substantially horizontally disposed concrete block laden pallets; a first carriage vertically movable on said first upstanding frame portion; a second carriage vertically movable on said second upstanding frame portion; means for driving first and second carriages in unison and upon a common level with each other and up and down, said first and second upstanding frame members, respectively; means for supporting said pallet rack between said first and second carriages; a block receiving platform on said second carriage; a conveyor having one end pivotally and slidably supported on said second carriage below said platform and disposed to receive blocks slidably moved horizontally from said platform; roller and track means supporting said one end of said conveyor on said second carriage below said platform to permit said conveyor to pivot and slide relative to said platform; a power driven pusher mounted on said carriage and movably extendable and retractable beyond an end of said first carriage toward said second carriage for pushing blocks off from said pallets and onto said platform, said pusher when slidably pushing blocks off from said pallet tending to slide said pallets due to friction of said blocks thereon, thereby moving said pallets slightly beyond said shelves in said rack in a direction toward said second carriage; pallet retraction means pivoted on said pusher on a horizontal axis; downwardly directed pallet edge engaging means on said pallet retraction means at an end of said pusher directed toward said second carriage; first cam means on said first carriage; and second cam means on said pallet retraction means; engagement of said first and second cam means caused by movement of said pusher on said carriage causing pivotal movement of said pallet retraction means about said horizontal axis and downwardly at said pallet edge engaging means when said pusher projects blocks from one of said pallets and onto said platform whereby an edge of the respective pallet is engaged by said downwardly directed pallet edge engaging means whereupon retraction of said pusher causes the pallet to be pulled back into position in a respective shelf of a supporting rack, said first and second cam means being disposed to pivot said pallet retraction means upwardly to move said pallet edge engaging means out of engagement with an edge of said pallet when said pusher is retracted relative to said first carriage to a position corresponding with a proper position of a pallet relative to a shelf in said rack.

9. In a rack unloader and concrete block pallet stripper the combination of: first and second horizontally spaced upstanding frame portions disposed to receive a concrete block pallet rack therebetween, said rack having vertically superimposed spaced pallet shelves disposed to support substantially horizontally disposed concrete block laden pallets; a first carriage vertically movable on said first upstanding portion of said frame; a second carriage vertically movable on said second upstanding portion of said frame; means for driving said first and second carriages in unison and upon a common level with each other up and down, said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movably extendable and retractable beyond an end of said first carriage toward said second carriage for pushing blocks off from said pallets and toward said conveyor; said pusher when slidably pushing blocks off from said pallets tending to slide said pallets out of the shelves in said rack in a direction toward said second carriage; pallet retraction means pivoted on said pusher on a horizontal axis; downwardly directed pallet edge engaging means of said pallet retraction means at an end of said pusher directed toward said second carriage; and second cam means on said pallet retraction means; engagement of said first and second cam means caused by movement of said pusher on said first carriage disposed to cause pivotal movement of said pallet retraction means about a horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack; an end of said conveyor opposite to that supported on said second carriage pivotally supported on a horizontal axis means and stationary means stationarily mounting said horizontally disposed axis means.

10. In a rack unloader and concrete block pallet stripper the combination of: first and second horizontally spaced upstanding frame portions disposed to receive a concrete block pallet rack therebetween; said rack having vertically superimposed spaced pallet shelves disposed to support substantially horizontally disposed concrete block laden pallets; a first carriage vertically movable on said first upstanding frame portion; a second carriage vertically movable on said second upstanding frame portion; means for driving said first and second carriages in unison and upon a common level with each other and up and down, said first and second upstanding frame portions, respectively; means for supporting said pallet rack between said first and second carriages; a block receiving platform on said second carriage; a conveyor having one end thereof pivotally and slidably supported on said second carriage below said platform and disposed to receive blocks slidably moved horizontally from said platform; a power driven pusher mounted on said first carriage and movably extendable and retractable beyond an end of said first carriage toward said second carriage for pushing blocks off from said pallets and onto said platform; said pusher when slidably pushing blocks off from said pallets tending to slide said pallets out of said shelves due to friction of said concrete blocks on said pallets, thereby moving said pallets in a direction toward second carriages; pallet retraction means pivoted on said pusher on a horizontal axis; downwardly directed pallet edge engaging means on said pallet retraction means at an end of said pusher directed toward said second carriage; first cam means on said first carriage; and second cam means on said pallet retraction means; engagement of said first and second cam means caused by movement of said pusher on said first carriage causing pivotal movement of said pallet retraction means about said horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to pivot said pallet retraction means upwardly to move said pallet edge engaging means out of engagement with an edge of said pallet when said pusher is retracted relative to said first carriage to a position corresponding with a proper position of a pallet relative to a shelf in said rack; an end of said conveyor opposite to that supported on said second carriage pivotally supported on a horizontally disposed axis means; and stationary means stationarily supporting said horizontally disposed axis means.

11. In a rack unloader and concrete block pallet stripper the combination of: first and second horizontally spaced upstanding frame portions disposed to receive a concrete block pallet rack therebetween, said rack having vertically superimposed spaced pallet shelves disposed to support substantially horizontally disposed concrete block laden pallets; a first carriage vertically movable on said first upstanding portion of said frame; a second carriage vertically movable on said second upstanding portion of said frame; means for driving said first and second carriages in unison and upon a common level with each other up and down, said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movably extendable and retractable beyond an end of said first carriage toward said second carriage for pushing blocks off from said pallets and toward said conveyor; said pusher when slidably pushing blocks off from said pallets tending to slide said pallets out of the shelves in said rack in a direction toward said second carriage; pallet retraction means pivoted on said pusher on a horizontal axis; downwardly directed pallet edge engaging means of said pallet retraction means at an end of said pusher directed toward said second carriage; and second cam means on said pallet retraction means; engagement of said first and second cam means caused by movement of said pusher on said first carriage disposed to cause pivotal movement of said pallet retraction means about a horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to permit pivotal movement of said pallet retraction means upwardly to move said pallet edge engaging means out of engagement with an edge of said pallet when said pusher is retracted relative to said first carriage to a position corresponding with a proper position of a pallet relative to a shelf in said rack; means on said second carriage forming a stop for a pallet when slidably pushed from a rack by said pusher.

12. In a rack unloader and concrete block pallet stripper the combination of: first and second horizontally spaced upstanding frame portions disposed to receive a concrete block pallet rack therebetween; said rack having vertically superimposed spaced pallet shelves disposed to support substantially horizontally disposed concrete block laden pallets; a first carriage vertically movable on said first upstanding frame portion; a second carriage vertically movable on said second upstanding frame portion; means for driving said first and second carriages in unison and upon a common level with each other and up and down, said first and second upstanding frame portions, respectively; means for supporting said pallet rack between said first and second carriages; a block receiving platform on said second carriage; a conveyor having one end thereof pivotally and slidably supported on said second carriage below said platform and disposed to receive blocks slidably moved horizontally from said platform; a power driven pusher mounted on said first carriage and movably extendable and retractable beyond an end of said first carriage toward said second carriage for pushing blocks off from said pallets and onto said platform; said pusher when slidably pushing blocks off from said pallets tending to slide said pallets out of said shelves due to friction of said concrete blocks on said pallets, thereby moving said pallets in a direction toward second carriages; pallet retraction means pivoted on said pusher on a horizontal axis; downwardly directed pallet edge engaging means on said pallet retraction means at an end of said pusher directed toward said second carriage; first cam means on said first carriage; and second cam means on said pallet retraction means; engagement of said first and second cam means caused by movement of said pusher on said first carriage causing pivotal movement of said pallet retraction means about said horizontal axis and downwardly at said pallet edge engaging means when said pusher projects blocks from one of said pallets toward said conveyor, whereby an edge of the respective pallet is engaged by said downwardly directed pallet edge engaging means whereupon retraction of said pusher causes the pallet to be pulled back into position in a respective shelf of a supporting rack; said first and second cam means being disposed to pivot said pallet retraction means upwardly to move said pallet edge engaging means out of engagement with an edge of said pallet when said pusher is retracted relative to said first carriage to a position corresponding with a proper position of a pallet relative to a shelf in said rack; means on said second carriage forming a stop for a pallet when slidably pushed from a rack by said pusher.

13. In a rack unloader and concrete block pallet stripper the combination of: first and second horizontally spaced upstanding frame portions disposed to receive a concrete block pallet rack therebetween, said rack having vertically superimposed space shelves disposed to support substantially horizontally disposed concrete block laden pallets; a first carriage vertically movable on said first upstanding frame portion; a second carriage vertically movable on said second upstanding frame portion; means for driving said first and second carriages in unison and upon a common level with each other and up and down relative to said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movably extendable and retractable beyond an end of said first carriage toward said second carriage for pushing blocks off from said pallets and toward said conveyor; said pusher when slidably pushing blocks off from said pallets tending to slide said pallets out of the shelves in said racks in a direction toward said second carriage; stop means forming an abutment for said pallets and carried by said second carriage; pallet retraction means on said pusher and having upwardly and downwardly movably mounted pallet engaging means on said pallet retraction means at an end of said pusher directed toward said second carriage; actuator means on said pusher for moving said pallet engaging means upwardly and downwardly to project said pallet edge engaging means below a plane of said pallet and beyond the edge thereof when said pusher is extended; wherein said pallet edge engaging means may be projected downwardly when said pusher pushes said concrete blocks off said pallet toward said conveyor and causes the pallet to engage said stop means and whereby retraction of said pusher causes said pallet to be pulled back into position in a respective shelf of a supporting rack; and means for operating said actuator means to release said pallet edge engaging means from an edge of said pallet when said pusher is retracted to a position to carry said pallet into correspondence with a proper position of the pallet relative to a shelf in said rack.

14. In a rack unloader and concrete block pallet stripper the combination of: first and second horizontally spaced upstanding frame portions disposed to receive a concrete block pallet rack therebetween, said rack having vertically superimposed spaced shelves disposed to support substantially horizontally disposed concrete block laden pallets; a first carriage vertically movable on said first upstanding frame portion; a second carriage vertically movable on said second upstanding frame portion; means for driving said first and second carriages in unison and upon a common level with each other and up and down relative to said first and second upstanding frame portions, respectively; means for supporting said pallet rack between said first and second carriages; a conveyor having one end pivotally supported on said second carriage and disposed to receive blocks slidably moved horizontally from said pallets; a power driven pusher mounted on said first carriage and movably extendable and retractable beyond an end of said first carriage toward said second carriage for pushing blocks off from said pallets and toward said conveyor; said pusher when slidably pushing blocks off from said pallets tending to slide said pallets out of the shelves in said racks in a direction toward said second carriage; stop means forming an abutment for limiting outward movement of said pallets; pallet retraction means; upwardly and downwardly movably mounted pallet engaging means on said pallet retraction means; actuator means for moving said pallet engaging means upwardly and downwardly to project said pallet edge engaging means in a plane of said pallet edge; wherein said pallet edge engaging means may be projected when said pusher pushes said concrete blocks off said pallet toward said conveyor and causes the pallet to engage said stop means; and means for forcing said pallet edge engaging means toward said first carriage to retract said pallets away from said stop means and back into a respective rack.

References Cited by the Examiner
UNITED STATES PATENTS

| | | | |
|---|---|---|---|
| 2,917,191 | 12/1959 | Pries et al. | 214—16.4 |
| 3,019,925 | 2/1962 | Gray | 214—310 |
| 3,217,906 | 11/1965 | Crile et al. | 214—16.4 |

MARVIN A. CHAMPION, *Primary Examiner.*